United States Patent
Bakthavathsalu et al.

(10) Patent No.: US 8,874,177 B2
(45) Date of Patent: Oct. 28, 2014

(54) REDUCING WLAN POWER CONSUMPTION ON A MOBILE DEVICE UTILIZING A CELLULAR RADIO INTERFACE

(71) Applicant: Research In Motion Limited, Waterloo (CA)

(72) Inventors: Krishna Kumar Bakthavathsalu, Toronto (CA); Ion Barbu, Waterloo (CA); Nayef Fawaz Mendahawi, Kitchener (CA); Ahmad Mohammad Mohammad Kholaif, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 128 days.

(21) Appl. No.: 13/756,698

(22) Filed: Feb. 1, 2013

(65) Prior Publication Data
US 2013/0170419 A1 Jul. 4, 2013

Related U.S. Application Data

(63) Continuation of application No. 13/461,893, filed on May 2, 2012, now Pat. No. 8,385,988, which is a continuation of application No. 12/713,235, filed on Feb. 26, 2010, now Pat. No. 8,195,251.

(51) Int. Cl.
*H04B 1/38* (2006.01)
*H04B 1/04* (2006.01)
*H04W 52/02* (2009.01)

(52) U.S. Cl.
CPC .................................. *H04W 52/02* (2013.01)
USPC ........................................ 455/574; 455/127.4

(58) Field of Classification Search
USPC ......... 455/574, 127.5, 127.4, 432.1, 436–448
See application file for complete search history.

(56) References Cited

U.S. PATENT DOCUMENTS

| 7,200,397 B1 | 4/2007 | Jones et al. |
| 7,289,478 B1 * | 10/2007 | Kim et al. ............... 370/338 |

(Continued)

FOREIGN PATENT DOCUMENTS

| EP | 1069794 | 1/2001 |
| EP | 2048798 | 4/2009 |

OTHER PUBLICATIONS

Kyritsi, Persefoni, Third Exam Report for EP 12164640.0, Apr. 8, 2013.
Li, Mei, First Office Action for CA 2,726,753, Apr. 9, 2013.
Li, Mei, Second Office Action for CA2,726,753, Feb. 3, 2014.
Kyritsi, Persefoni, Extended European Search Report for EP 10154852.7, Jul. 27, 2010.

(Continued)

*Primary Examiner* — Joel Ajayi
(74) *Attorney, Agent, or Firm* — Integral Intellectual Property Inc.; Miriam Paton

(57) ABSTRACT

A system and method of reducing the WLAN power consumption and limiting battery drain of a mobile communications device is provided. The mechanism continuously monitors for changes in the WLAN and cellular signal strength and modifies the WLAN profile scanning activity accordingly. By monitoring for changes, transitions can be detected which indicate the location of the mobile device (i.e., indoor or outdoor). An increase in cellular signal strength and a decrease in WLAN signal strength indicates the user is transitioning outdoors where WLAN coverage may be limited. To reduce battery power consumption, background scanning is suspended or its frequency significantly lowered. Moving indoors is indicated by a decrease in cellular signal strength and an increase in WLAN signal strength. Background/Connectivity scanning frequency is increased to provide shorter time-to-connect to WLAN Networks for the user within the WLAN coverage area.

12 Claims, 13 Drawing Sheets

(56) References Cited

U.S. PATENT DOCUMENTS

| | | |
|---|---|---|
| 2004/0176024 A1 | 9/2004 | Hsu et al. |
| 2005/0048972 A1 | 3/2005 | Dorenbosch et al. |
| 2007/0149211 A1 | 6/2007 | Dunn et al. |
| 2008/0176579 A1 | 7/2008 | Abdel-Kader |
| 2008/0198820 A1 | 8/2008 | Abdel-Kader |
| 2008/0248749 A1 | 10/2008 | Bahl et al. |
| 2012/0163344 A1 | 6/2012 | Bakthavathsalu et al. |

OTHER PUBLICATIONS

Kyritsi, Persefoni, Extended European Search Report for EP 12164640.0, Jun. 26, 2012.

Kyritsi, Persefoni, First Examination Report for EP 12164640, Nov. 26, 2012.

Smadi, Mohammed et al., A Study of WLAN-to-Cellular Handover Using Measured Building-Exit Data, IEEE Transactions on Vehicular Technology, vol. 58, No. 4, May 2009.

* cited by examiner

US 8,874,177 B2

REDUCING WLAN POWER CONSUMPTION ON A MOBILE DEVICE UTILIZING A CELLULAR RADIO INTERFACE

FIELD OF THE DISCLOSURE

The WLAN power consumption reduction mechanism relates to the field of data communications, and more particularly relates to a system and method for reducing WLAN power consumption on a mobile device using a cellular radio interface.

BACKGROUND

Current wireless mobile communication devices include microprocessors, memory, soundcards, and run one or more software applications in addition to providing for voice communications. Examples of software applications used in these wireless devices include micro-browsers, address books, email clients, instant messaging (IM) clients, and wavetable instruments. Additionally, wireless devices have access to a plurality of services via the Internet. A wireless device may, for example, be used to browse web sites on the Internet, to transmit and receive graphics, and to execute streaming audio and/or video applications. The transfer of Internet content to and from wireless device is typically facilitated by the Wireless Application Protocol (WAP), which integrates the Internet and other networks with wireless network platforms. Such wireless devices may operate on a cellular network, on a wireless local area network (WLAN), or on both of these types of networks.

With respect to WLANs, the term "Wi-Fi" or Wireless Fidelity pertains to certain types of WLANs that use specifications in the Institute of Electrical and Electronics Engineers ("IEEE") 802.11 family.

In a WLAN, an access point is a station that transmits and receives data (sometimes referred to as a transceiver). An Access Point in an infrastructure BSS (or a client node acting as an AP in an Independent BSS) connects users to other users within the network and also can serve as the point of interconnection between the WLAN and a wired LAN. Each access point can serve multiple users within a defined network area. As users move beyond the range of one access point (i.e., when they roam), they are automatically handed over to the next one. A small WLAN may only require a single access point. The number of access points required increases as a function of the number of network users and the physical size of the network. The access point is typically an IEEE 802.11 (i.e. WLAN) radio receiver/transmitter (or transceiver) and functions as a gateway or bridge between a WLAN and a wired LAN.

A block diagram illustrating an example wireless communications system is shown in FIG. 1. The example system, generally referenced 10, comprises one or more mobile devices 12 implementing a WLAN station connected to access point (AP) 14 which is connected to network 16. The system also comprises a cellular base station 20 in communication over an air interface to the mobile device. The base station is connected to a cellular network 22 which is also connected to network 16.

A service set identifier (SSID) identifies a particular IEEE 802.11 wireless LAN. A client device receives broadcast messages from all access points within range advertising their SSIDs. The client device can then either manually or automatically select the network with which to associate. It is legitimate for multiple access points to share the same SSID if they provide access to the same network as part of an extended service set.

The basic service set (BSS) is the basic building block of an IEEE 802.11 wireless LAN. In infrastructure mode one access point (AP) together with all associated stations (STAs) is called a BSS. An AP acts as a master to control the stations within that BSS. Each BSS is identified by a Basic Service Set Identifier (BSSID). The most basic BSS is two STAs in Independent mode. In infrastructure mode, a basic BSS consists of one AP and one STA. The BSSID uniquely identifies each BSS (the SSID however, can be used in multiple, possibly overlapping, BSSs). In an infrastructure BSS, the BSSID is the MAC address of the wireless access point (WAP).

When a station wants to access an existing BSS (such as after power-up, sleep mode or just entering a BSS area), the station must get synchronization information from the Access Point. The station obtains this information by either (1) passive scanning whereby the station waits to receive a Beacon frame (and/or Probe Responses sent in response to other stations' Probe Requests) from the Access Point; or (2) active scanning whereby the station attempts to find an Access Point by transmitting Probe Request frames and waiting for a Probe Response from the Access Point. Note that the Beacon frame is a periodic frame sent by the Access Point containing synchronization information.

Once the station has found an Access Point, in order to join the BSS, it must perform the Authentication Process which involves the exchange of information between the Access Point and the station, where each side shows knowledge of a shared credential(s).

Once authenticated, the station begins the Association Process which involves the exchange of information about the station and BSS capabilities. Only after the association process is complete, is the station permitted to transmit and receive data frames with the Access Point.

In implementing the WLAN protocol, communications devices often utilize so called WLAN profiles to aid in establishing connections between stations and access points. A wireless local area network profile defines the parameters for the connection between the station and WLAN networks including access points. Profiles typically include connection related information including, for example, SSID, connection type (i.e., open or shared key), security, authentication, encryption, WEP shared keys, key length, frequency bands, roaming enable/disable, SSID broadcasted, etc.

Wireless devices are typically battery operated. As such, conserving battery power is important as doing so allows the wireless device to operate for an extended period of time. To conserve battery power, the wireless device will typically enter a "sleep mode" when it is not actively participating in a communication. During this sleep mode the wireless device will still monitor activity on the WLAN to determine if it should "wake up" and enter into a communication.

BRIEF DESCRIPTION OF THE DRAWINGS

The WLAN power consumption reduction mechanism is herein described, by way of example only, with reference to the accompanying drawings, wherein.

DETAILED DESCRIPTION

Notation Used Throughout

Figure 1:
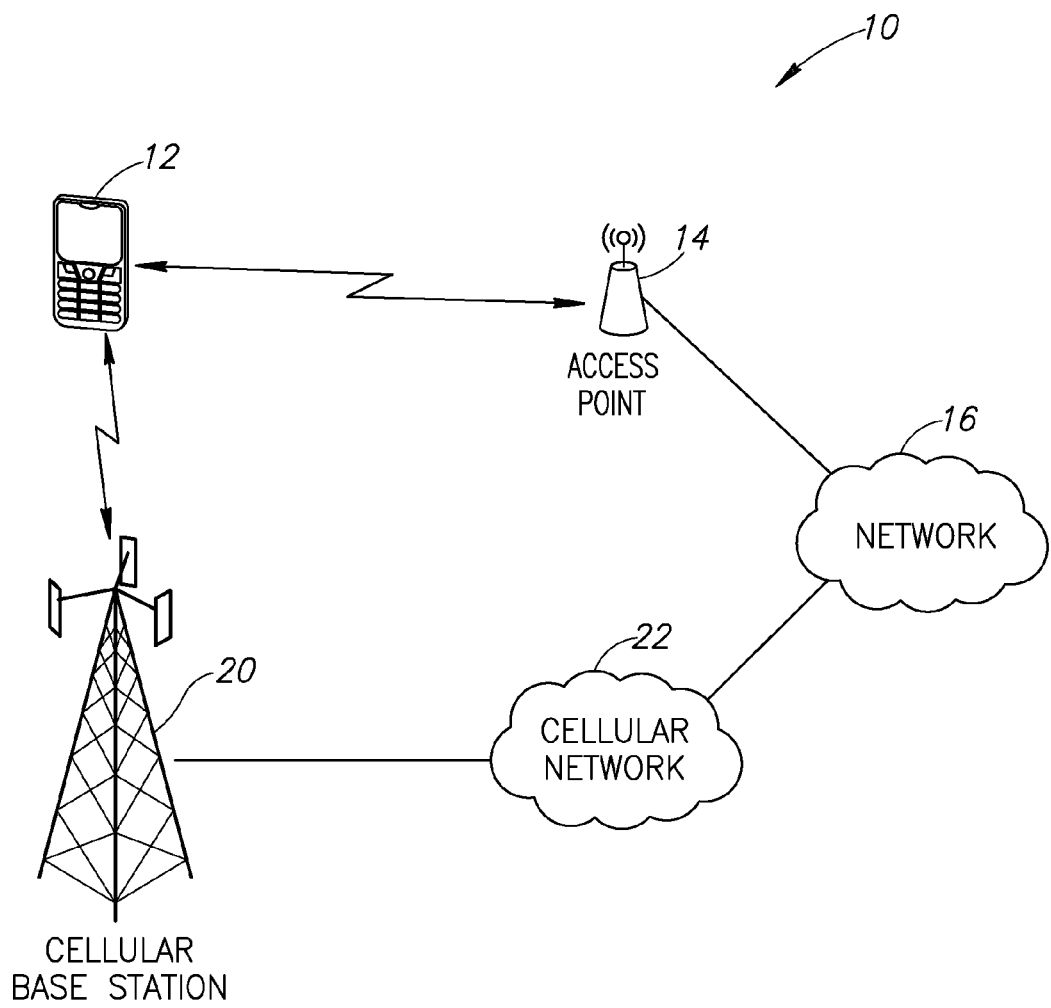
FIG. 1 is a block diagram illustrating an example wireless communications system.

The following notation is used throughout this document:

| Term | Definition |
|---|---|
| AP | Access Point |
| ARP | Address Resolution Protocol |
| ASIC | Application Specific Integrated Circuit |
| BSS | Basic Service Set |
| BSSID | Basic Service Set ID |
| CDROM | Compact Disc Read Only Memory |
| CPU | Central Processing Unit |
| DHCP | Dynamic Host Configuration Protocol |
| DNS | Domain Name Server |
| DSP | Digital Signal Processor |
| EDGE | Enhanced Data rates for GSM Evolution |
| EEROM | Electrically Erasable Read Only Memory |
| EPROM | Erasable Programmable Read-Only Memory |
| FM | Frequency Modulation |
| FPGA | Field Programmable Gate Array |
| FTP | File Transfer Protocol |
| GPRS | General Packet Radio Service |
| GPS | Global Positioning System |
| GSM | Global System for Mobile communications |
| HDL | Hardware Description Language |
| HTTP | Hyper-Text Transport Protocol |
| IEEE | Institution of Electrical and Electronics Engineers |
| IM | Instant Messaging |
| IP | Internet Protocol |
| LAN | Local Area Network |
| MAC | Media Access Control |
| PC | Personal Computer |
| PCI | Peripheral Component Interconnect |
| PDA | Personal Digital Assistant |
| PNA | Personal Navigation Assistant |
| RAM | Random Access Memory |
| RAT | Radio Access Technology |
| RF | Radio Frequency |
| ROM | Read Only Memory |
| RSSI | Received Signal Strength Indicator |
| RUIM | Re-Usable Identification Module |
| SDIO | Secure Digital Input/Output |
| SIM | Subscriber Identity Module |
| SPI | Serial peripheral interconnect |
| SSID | Service Set Identifier |
| TCP | Transport Control Protocol |
| UI | User Interface |
| URL | Uniform Resource Locator |
| USB | Universal Serial Bus |
| UWB | Ultra-Wideband |
| WAN | Wide Area Network |
| WAP | Wireless Access Point |
| WAP | Wireless Application Protocol |
| WEP | Wired Equivalent Protocol |
| WLAN | Wireless Local Area Network |

DETAILED DESCRIPTION

A novel and useful system and method of reducing the WLAN power consumption and limiting battery drain of a mobile communications device is provided. The WLAN power consumption reduction mechanism is operative to monitor for changes in the WLAN and cellular signal strength (e.g., RSSI values). Depending on the changes detected, the mobile device modifies the WLAN profile scanning activity. A cellular/WLAN signal quality ratio is calculated based on RSSI values received from both air interfaces and its trend is monitored to detect transitions which indicate the approximate location of the mobile device (i.e. indoor or outdoor). An increase in cellular signal strength coupled with a decrease in WLAN signal strength (i.e. ratio increases) indicates that the user might be moving to an outdoor environment where WLAN coverage may be sparse or limited. The device checks the scan results table for a time t and if no AP is found during that period it suspends the WLAN background/connectivity scan, thus significantly reducing battery power consumption. When the user moves to an indoor environment, a decrease in cellular signal strength with an increase in WLAN signal strength indicate that the user is moving to an indoor environment. In this case, the WLAN background scanning frequency is increased in order to provide better coverage and short time access to the WLAN network for the user. If no matching WLAN networks are present in the device saved WLAN profile list, however, the indoor background scanning frequency can be reduced gradually using a backoff timing algorithm until a new device transition is detected. Note that in the alternative, one skilled in the art can use a WLAN/cellular signal quality ratio (i.e. the inverse) rather than a cellular/WLAN ratio, with the same WLAN power savings obtained. For illustration purposes only, the mechanism is described throughout this document using the cellular/WLAN ratio.

To aid in illustrating the implementations of the WLAN power consumption reduction mechanism, the various implementations described infra are described in the context of an example communication system including a mobile communications device that implements IEEE 802.11-based wireless networking standards. It is appreciated, however, that those of ordinary skill in the art, using the teachings provided herein, can implement the disclosed techniques using other wireless standards and networks without departing from the scope of the mechanism. Accordingly, references to techniques and components specific to IEEE 802.11 apply also to the equivalent techniques or components in other wireless network standards unless otherwise noted.

Note that some aspects of the mechanism described herein may be constructed as software objects that are executed in embedded devices as firmware, software objects that are executed as part of a software application on either an embedded or non-embedded computer system such as a digital signal processor (DSP), microcomputer, minicomputer, microprocessor, etc running a real-time operating system such as WinCE, Symbian, OSE, Embedded LINUX, etc. or non-real time operating system such as Windows, UNIX, LINUX, etc., or as soft core realized HDL circuits implemented in an Application Specific Integrated Circuit (ASIC) or Field Programmable Gate Array (FPGA), or as functionally equivalent discrete hardware components.

Several advantages of the WLAN power consumption reduction mechanism include: (1) conserving mobile device battery drain by preventing unnecessary power consumption due to the device being moved to an environment in which there is little or no WLAN connectivity; (2) the ability to determine the location of a mobile device; either indoors or outdoors; and (3) better matching the WLAN background scanning to the actual environment the device is in.

As will be appreciated by one skilled in the art, the WLAN power consumption reduction mechanism may be implemented as a system, method, computer program product or any combination thereof. Accordingly, the WLAN power consumption reduction mechanism may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the WLAN power consumption reduction mechanism may take the form of a computer program product implemented in any tangible medium of expression having computer usable program code implemented in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code implemented therewith, either in baseband or as part of a carrier wave. The computer usable program code may be transmitted using any appropriate medium, including but not limited to wireless, wireline, optical fiber cable, RF, etc.

Computer program code for carrying out operations of the WLAN power consumption reduction mechanism may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The WLAN power consumption reduction mechanism is described below with reference to flowchart illustrations and/or block diagrams of methods, apparatus (systems) and computer program products according to implementations thereof. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It is noted that computer programs implementing the WLAN power consumption reduction mechanism can be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this mechanism. All these operations are well-known to those skilled in the art of computer systems.

The flowchart and block diagrams in the Figures illustrate the architecture, functionality, and operation of possible implementations of systems, methods and computer program products according to various implementations of the WLAN power consumption reduction mechanism. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Mobile Communications Device Implementation

Figure 2:
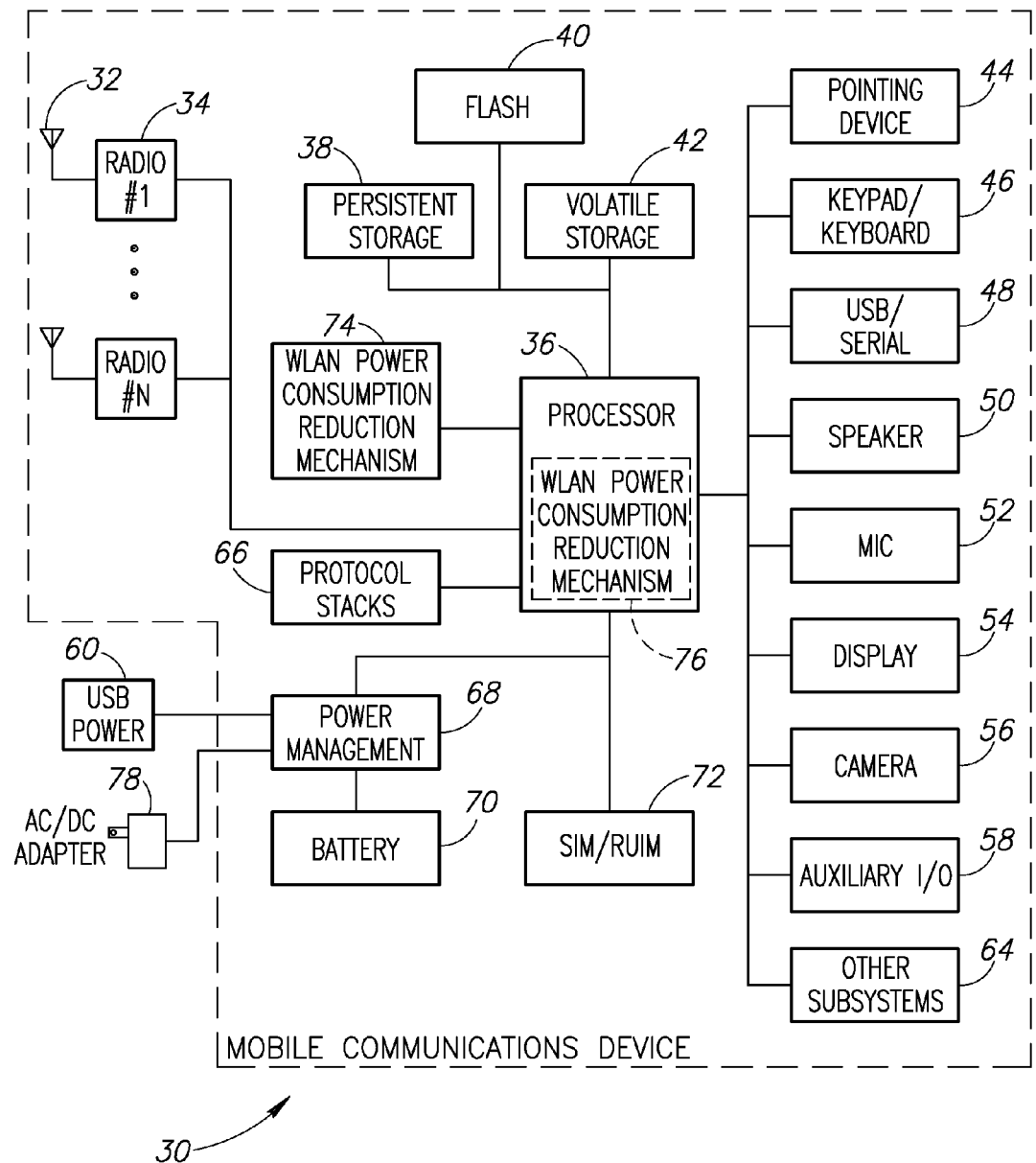
FIG. 2 is a block diagram illustrating an example wireless communication device incorporating the WLAN power consumption reduction mechanism.

A block diagram illustrating an example mobile communication device incorporating the WLAN power consumption reduction mechanism is shown in FIG. 2. The mobile communication device is preferably a two-way communication device having voice and data communication capabilities. In addition, the device optionally has the capability to communicate with other computer systems via the Internet. Note that the mobile communications device (or mobile device) may comprise any suitable wired or wireless device such as multimedia player, mobile communication device, cellular phone, smartphone, PDA, PNA, Bluetooth device, etc. For illustration purposes only, the device is shown as a mobile device, such as a cellular based smartphone. Note that this example is not intended to limit the scope of the mechanism as the WLAN power consumption reduction mechanism can be implemented in a wide variety of communication devices. It is further appreciated the mobile device 30 shown is intentionally simplified to illustrate only certain components, as the mobile device may comprise other components and subsystems 64 beyond those shown.

The mobile device, generally referenced 30, comprises a processor 36 which may comprise a baseband processor, CPU, microprocessor, DSP, etc., optionally having both analog and digital portions. The mobile device may comprise a plurality of radios 34 and associated antennas 32. Radios for the basic cellular link and any number of other wireless standards and Radio Access Technologies (RATs) may be included. Examples include, but are not limited to, Global System for Mobile Communication (GSM)/GPRS/EDGE 3G; WCDMA; WiMAX for providing WiMAX wireless connectivity when within the range of a WiMAX wireless network; Bluetooth for providing Bluetooth wireless connectivity when within the range of a Bluetooth wireless network; WLAN for providing wireless connectivity when in a hot spot or within the range of an ad hoc, infrastructure or mesh based wireless LAN (WLAN) network; near field communications; UWB; GPS receiver for receiving GPS radio signals transmitted from one or more orbiting GPS satellites, FM transceiver provides the user the ability to listen to FM broadcasts as well as the ability to transmit audio over an unused FM station at low power, such as for playback over a car or home stereo system having an FM receiver, digital broadcast television, etc. The mobile device also comprises protocol stacks 66, which may or may not be entirely or partially implemented in the processor 36. The protocol stacks implemented will depend on the particular wireless protocols required.

The mobile device may also comprise internal volatile storage 42 (e.g., RAM) and persistence storage 38 (e.g., ROM) and flash memory 40. Persistent storage 38 also stores applications executable by processor 36 including the related data files used by those applications to allow device 30 to perform its intended functions. Several user-interface devices include trackball/thumbwheel 44 which may comprise a depressible thumbwheel/trackball that is used for navigation, selection of menu choices and confirmation of action, keypad/keyboard 46 such as arranged in QWERTY fashion for entering alphanumeric data and a numeric keypad for entering dialing digits and for other controls and inputs (the keyboard may also contain symbol, function and command keys such as a phone send/end key, a menu key and an escape key), microphone(s) 52, speaker(s) 50 and associated audio codec or other multimedia codecs, vibrator (not shown) for alerting a user, camera and related circuitry 56, display(s) 54 and associated display controller. A serial/USB or other interface connection 48 (e.g., SPI, SDIO, PCI, USD, etc.) provides a serial link to a user's PC or other device. SIM/RUIM card 72 provides the interface to a user's SIM or RUIM card for storing user data such as address book entries, user identification, etc.

Portable power is provided by the battery 70 coupled to power management circuitry 68. External power is provided via USB power 60 or an AC/DC adapter 78 connected to the power management circuitry 68 which is operative to manage the charging and discharging of the battery 70.

The mobile communications device is also adapted to implement the WLAN power consumption reduction mechanism 74. Alternatively (or in addition to), the WLAN power consumption reduction mechanism may be implemented as a task 74 stored in external memory executed by the processor 36 or may be implemented as a task 76 executed from memory embedded in processor 36. The WLAN power consumption reduction task blocks 74, 76 are adapted to implement the WLAN power consumption reduction mechanism as described in more detail infra. Note that the WLAN power consumption reduction mechanism may be implemented as hardware, software or as a combination of hardware and software. Implemented as a software task, the program code operative to implement the WLAN power consumption reduction mechanism is stored in one or more memories 38, 40, 42 or local memories within the processor 36.

WLAN Power Consumption Reduction Mechanism

The IEEE 802.11 standard defines several services that govern how two IEEE 802.11 devices communicate. In current WLAN technology, WLAN profiles play a vital role in WLAN connectivity. A profile is identified by a unique identifier, Service Set Identifier (SSID). It also specifies the frequency band of operation, data rates, transmit power levels and security methods used for authentication and encryption and the corresponding credentials. A user can specify multiple profiles on his device that could be geographically collocated or they could map to WLAN networks installed in different areas (e.g., home vs. office, etc).

Today, many mobile communications devices are equipped not only with the primary cellular air interface but with WLAN radios as well, e.g., dual-band mobile smart phones that feature both cellular and WLAN air interfaces). Such multi-radio devices must perform a scan in order to discover the neighboring Access Points (APs) to which the handset can associate/connect. An AP must match one of the profiles stored on the device (either created by the user or pushed by an IT policy) for the device to associate with.

Typical implementations of the WLAN algorithm include continuous scanning for saved WLAN profiles on regular intervals. A downside of the periodic connectivity scan is that the mobile device is not aware of its surrounding environment. In the case where the device is out of WLAN coverage, scanning is still performed which results in excessive consumption of battery power. This strongly affects both the battery life-time and talk-time otherwise possible. The amount of battery power used during this scanning period is directly proportional to the number of saved profiles and other factors, e.g., whether a saved profile is marked as "hidden" vs. "broadcast" SSID. As the number of saved profiles increases, the power consumption of the mobile device increases as well.

In prior art WLAN systems, a problem occurs when the mobile device is located outdoors out of range of an AP. In this case, it is not necessary to perform frequent background scanning since it is not likely the device is within range of an WLAN Access Point. Continuing to scan for WLAN networks at high frequency when the mobile device is outdoors results in a substantial waste of battery power. Conversely, when the mobile device is indoors, it is important to quickly scan for WLAN networks such as if a temporary loss of WLAN coverage occurs, since it is preferable that users be re-connected as soon possible after a temporary loss of coverage.

Thus, to minimize or eliminate the battery draining effects of pointless scanning when the mobile device is outdoors, the WLAN power consumption reduction mechanism is operative to use information from both the WLAN network and the cellular network to determine whether the mobile device (also referred to as handset, WLAN client, client, mobile communications device, handheld or device) is indoors or outdoors. If the mobile device is outdoors, then background scanning can be significantly reduced or stopped altogether, thereby conserving battery power.

It is noted that many existing WLAN installations are more common in indoor areas as an extension to cellular networks coverage. When outdoor, users typically have very good cellular coverage (except when crossing cell boundaries) and much weaker WLAN coverage (if any). The mechanism monitors the changes in patterns in both the WLAN and cellular radio signal strength to determine whether the mobile device is indoors or outdoors. In response, the mobile device modifies the WLAN power scheme to reduce or stop/start the WLAN profile scanning activity.

Using information from both the WLAN and cellular air interfaces, a cellular/WLAN signal quality ratio is calculated, stored and tracked. WLAN and cellular RSSI information received from their respective air interfaces is used. The quantification of the above ratio between changes (i.e. drops or increases) of the signals received from both air-interfaces provides the trend in the cellular/WLAN signal quality ratio. It is this trend that is used to determine the user's approximate location (i.e. indoor or outdoor and transitions therefrom).

If the mobile device is determined to be outdoors then scanning for WLAN networks can be done less frequently. The transition from indoors to outdoors is detected by a deterioration in WLAN Received Signal Strength Indicator (RSSI) with an accompanying increase in cellular RSSI. Once the transition is detected, a loss of WLAN connectivity causes the device to start scanning WLAN networks with a decreasing frequency.

If the mobile device is determined to be indoors, then scanning for WLAN networks can be made more frequently. Assuming the mobile device is currently scanning for WLAN networks with the outdoor frequency as described above, upon connecting to a WLAN network, the WLAN RSSI and the cellular RSSI are monitored. A transition from outdoors to indoors is detected by a deterioration in cellular RSSI with an accompanying increase in WLAN RSSI.

Figure 3:
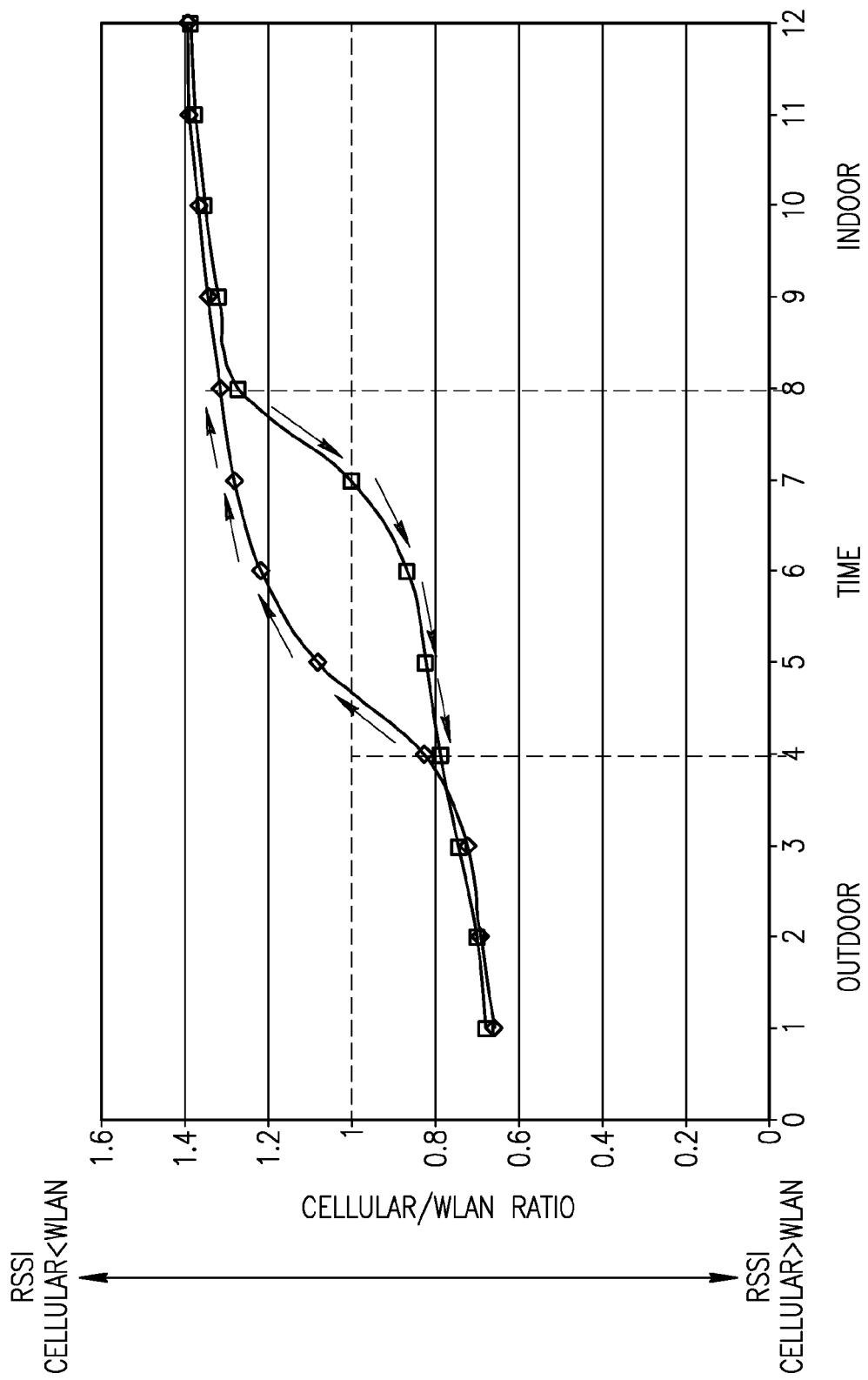
FIG. 3 is an example graph of cellular/WLAN signal quality ratio for an indoor to outdoor and an outdoor to indoor transition of a mobile handheld device.

An example graph of cellular/WLAN signal quality ratio for an indoor to outdoor and an outdoor to indoor transition is shown in FIG. 3. Trace 80 represents the cellular/WLAN RSSI ratio values for the mobile device making a transition from an indoor location to an outdoor location over a period of time. Trace 82 represents the cellular/WLAN RSSI ratio values for the mobile device making a transition from an outdoor location to an indoor location over a period of time. Ratio values greater than one indicate the cellular RSSI is lesser than the WLAN RSSI. This typically indicates the mobile device is an indoor location. Conversely, ratio values less than one indicate a cellular RSSI greater than the WLAN RSSI. This typically indicates the mobile device is in an outdoor location.

Considering the notations CellularRSSI=C, WLAN RSSI=W, then:

Case1: If Ratio=C/W then
Ratio>1 means Cellular_RSSI<WLAN_RSSI, device is in an Indoor location
(e.g., −80 dBm Cellular_RSSI<−60 dBm WLAN_RSSI)
Ratio<1 means Cellular_RSSI>WLAN_RSSI, device is in an Outdoor location
(e.g., −60 dBm Cellular_RSSI>−80 dBm WLAN_RSSI)
Case2: If Ratio=W/C then
Ratio>1 means Cellular_RSSI>WLAN_RSSI, device is in an Outdoor location
(e.g., −60 dBm Cellular_RSSI<−80 dBm WLAN_RSSI)
Ratio<1 means Cellular_RSSI<WLAN_RSSI, device is in an Indoor location
(e.g., −80 dBm Cellular_RSSI<−60 dBm WLAN_RSSI)

Figure 4:
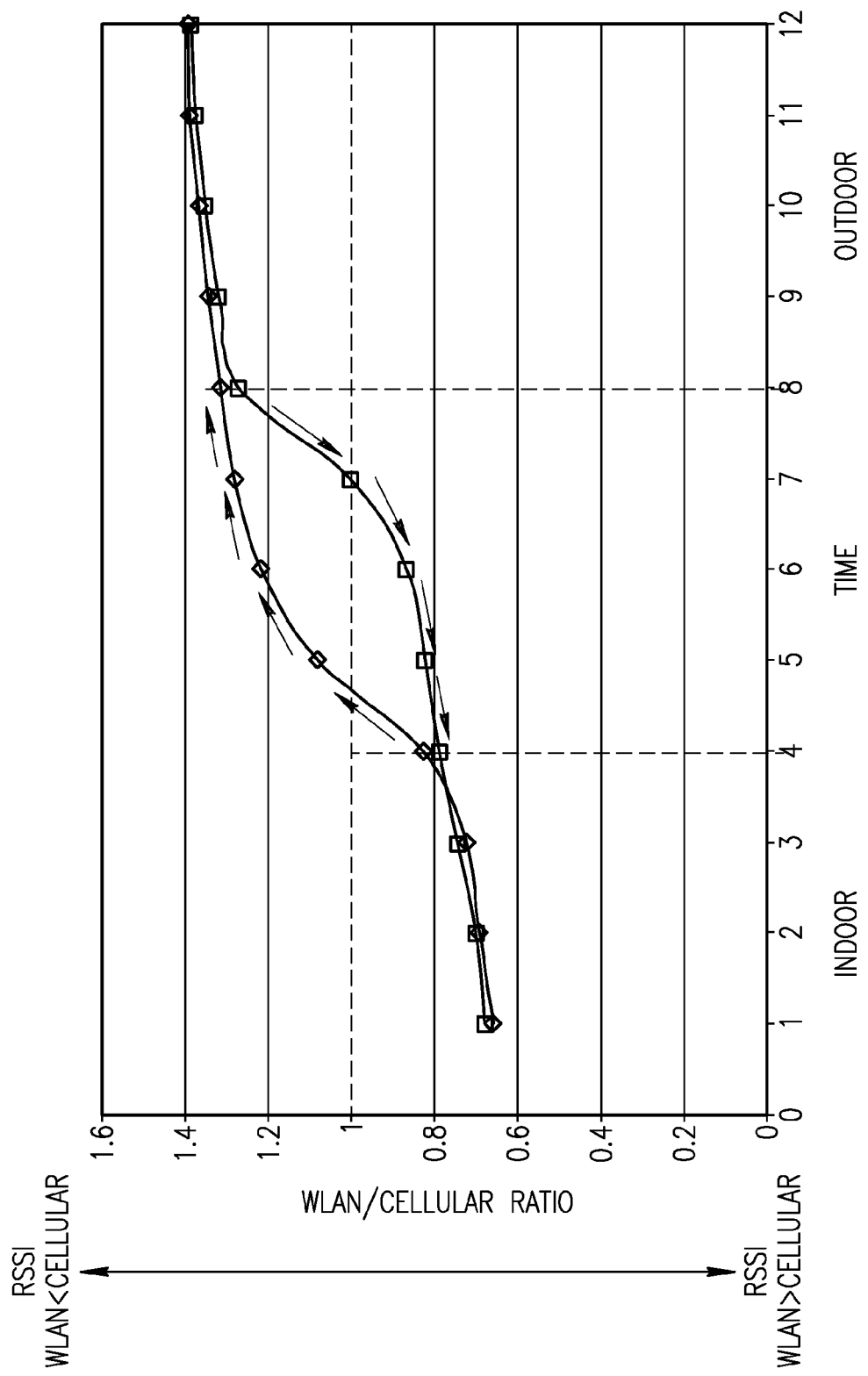
FIG. 4 is an example graph of WLAN/cellular signal quality ratio for an indoor to outdoor and an outdoor to indoor transition of a mobile handheld device.
Figure 5:
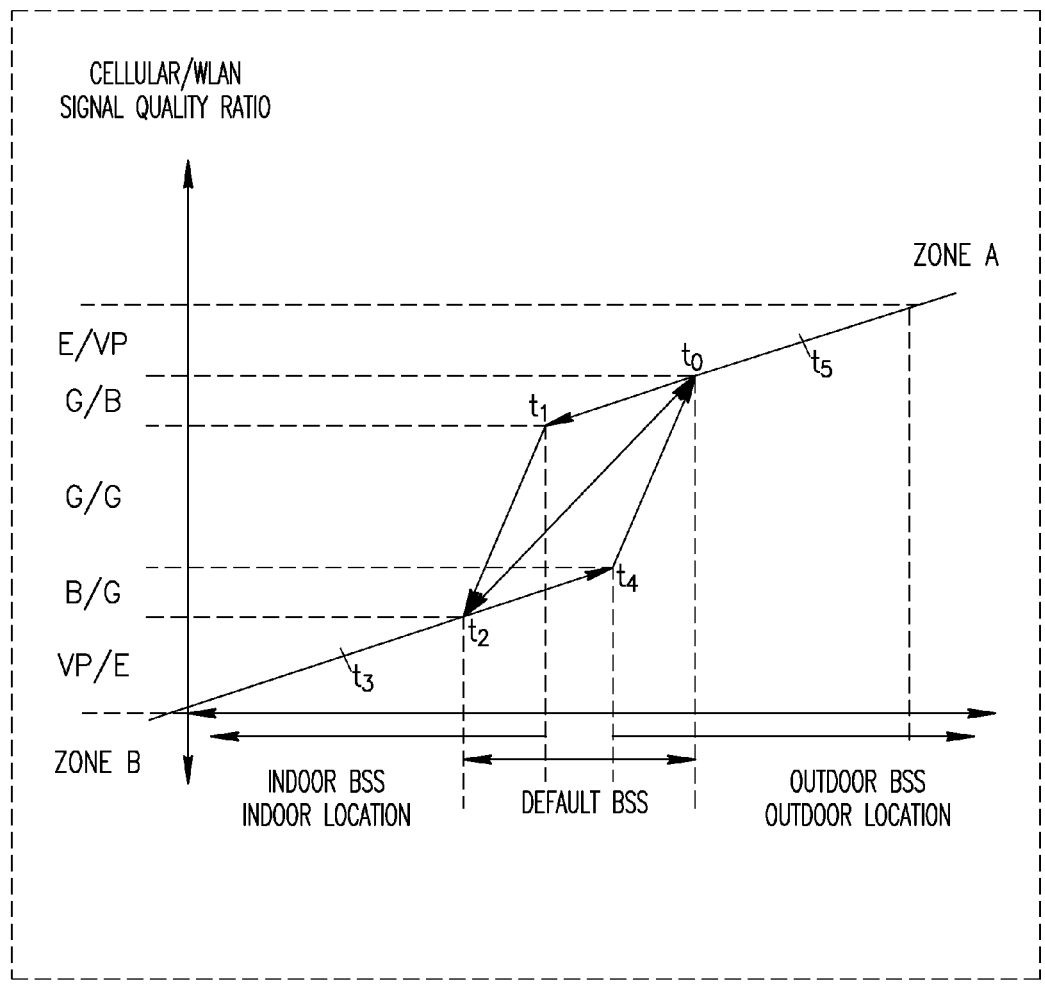
FIG. 5 is a diagram illustrating the changes in background scanning frequency and device indoor/outdoor location based on the cellular/WLAN signal quality ratio.

A diagram illustrating the changes in background scanning frequency based on the cellular/WLAN signal quality ratio is shown in FIG. 4. To aid in algorithmically determining the location of the mobile device, RSSI values for both cellular and WLAN have been categorized and defined as below in Table 1.

TABLE 1

Cellular and WLAN RSSI Category Definitions

| RSSI Value | Category | Representation |
| --- | --- | --- |
| Greater than −20 dBm | Excellent | E |
| −21 to −45 dBm | Very Good | VG |
| −46 to −65 dBm | Good | G |
| −66 to −75 dBm | Average | A |
| −76 to −85 dBm | Bad | B |
| −86 to −90 dBm | Poor | P |
| Lesser than −90 dBm | Very Poor | VP |

These RSSI value definitions are used in the graph of FIG. 4 to define the cellular/WLAN signal quality ratio levels as the mobile device moves between indoor (Zone B) and outdoor locations (Zone A).

In the case when the mobile device is transitioning from an outdoor location (low scanning frequency) to an indoor location (high scanning frequency), the possible transitions that can be made are identified and presented below in Table 2.

TABLE 2

Transitions for Outdoor to Indoor
Transition (To High
Background Scanning Frequency)

| Step A | Step B | Cellular/WLAN Signal Quality Ratio Transition |
|---|---|---|
| $t_0$ E/VP | $t_1$ G/B | $TR_1$ |
| $t_0$ E/VP | $t_2$ B/G | $TR_2$ |
| E/VP | VP/E | $TR_3$ |
| $t_1$ G/B | $t_2$ B/G | $TR_4$ |
| G/B | VP/E | $TR_5$ |
| $t_2$ B/G | $t_3$ VP/E | $TR_6$ |

Thus, six transitions, TR1 through TR6 are defined for the mobile device making a transition from an outdoor location to an indoor location (i.e., a transition from a low scanning frequency location to a high scanning frequency location).

Similarly, in the case when the mobile device is transitioning from an indoor location (high scanning frequency) to an outdoor location (low scanning frequency), the possible transitions that can be made are identified and presented below in Table 3.

TABLE 3

Transitions for Indoor to Outdoor
Transition (To Low
Background Scanning Frequency)

| Step A | Step B | Cellular/WLAN Signal Quality Ratio Transition |
|---|---|---|
| $t_2$ VP/E | $t_4$ B/G | $TR_7$ |
| $t_2$ VP/E | $t_0$ G/B | $TR_8$ |
| VP/E | E/VP | $TR_9$ |
| $t_4$ B/G | $t_0$ G/B | $TR_{10}$ |
| B/G | E/VP | $TR_{11}$ |
| $t_0$ G/B | $t_5$ E/VP | $TR_{12}$ |

Thus, six transitions, TR7 through TR12 are defined for the mobile device making a transition from an indoor location to an outdoor location (i.e. a transition from a high scanning frequency location to a low scanning frequency location).

It is appreciated that the transition thresholds provided in Tables 1, 2, 3 supra represent an example for illustration purposes. Numerous other threshold values and category definitions may be used depending on the particular implementation and design considerations.

Figure 6:
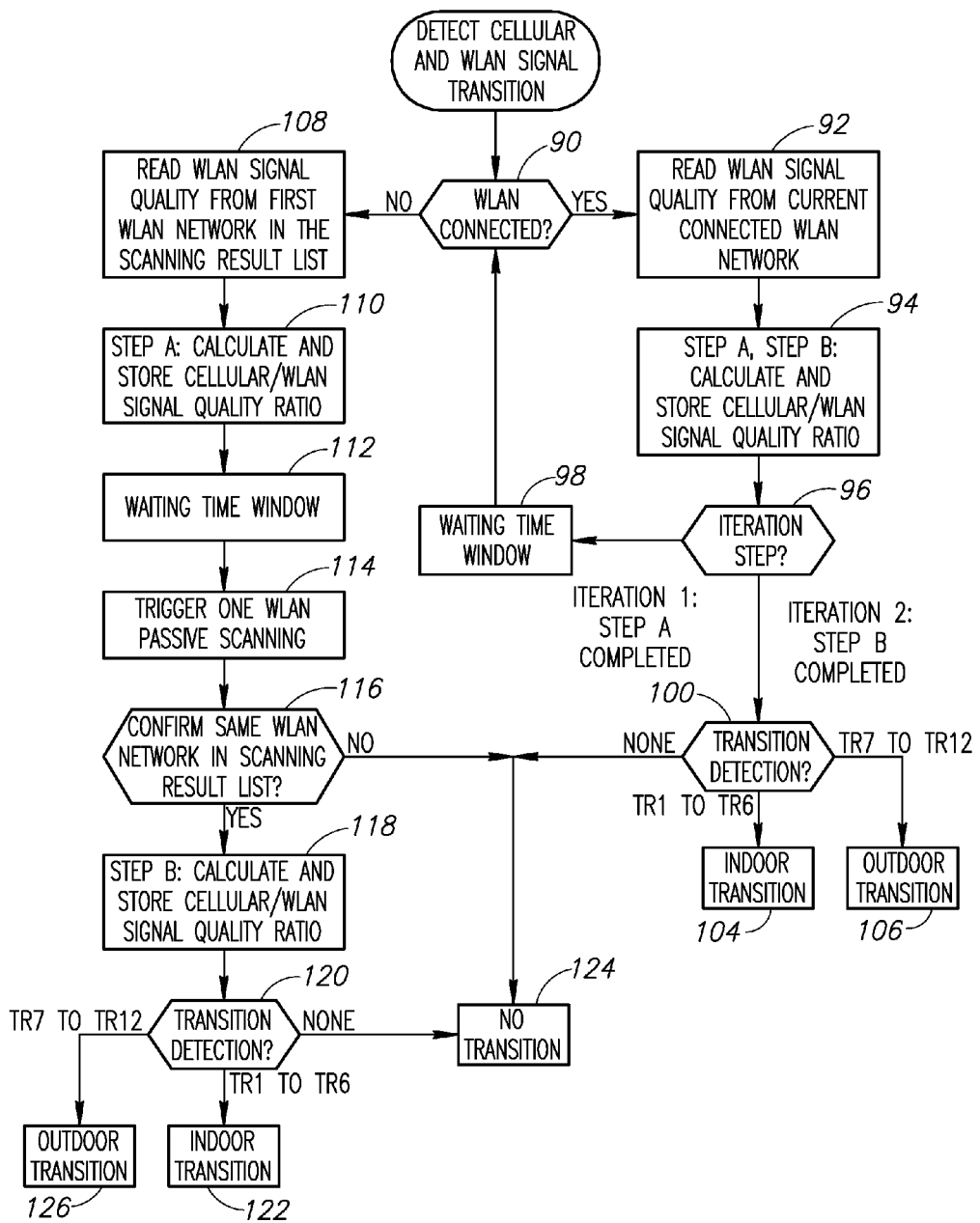
FIG. 6 is a flow diagram illustrating an example method of detecting cellular and WLAN radios signal transitions.

A flow diagram illustrating an example method of detecting cellular and WLAN signal transitions is shown in FIG. 6. This method attempts to detect a cellular and WLAN signal transition and is periodically performed (i.e. continuous basis). Depending on whether WLAN is connected (step 90), the device attempts to detect either an indoor or an outdoor transition.

If the WLAN is not connected, a WLAN scan is performed and the resulting scan results list is sorted according to RSSI value. The WLAN signal quality level is read from the first WLAN network in the scan results list (i.e. the strongest signal) (step 108). A first cellular signal quality instantaneous reading is made and the cellular/WLAN signal quality ratio is calculated (step 110). This step is referred to as STEP A. The device then waits a waiting time window, e.g., 2 seconds (step 112) and a single WLAN passive scanning is performed (step 114). If the first WLAN network on the scan results list is different than that found during step 108 above, then no transition is declared (step 124).

If the first WLAN network on the scan results list is confirmed as that found during step 108 above (step 116), then a second cellular signal quality instantaneous reading is made and the cellular/WLAN signal quality ratio is calculated (step 118). This step is referred to as STEP B. Note that STEP B can be repeated to increase the accuracy of device's location estimate. If a transition (TR1 to TR6) is detected (step 120) then an indoor transition is declared (step 122). If a transition (TR7 to TR12) is detected (step 120) then an outdoor transition is declared (step 126). If no transition TR1 to TR12 is detected (step 120) than 'no transition' is declared (step 124).

If WLAN is connected (step 90), the WLAN signal quality level is read from the currently connected WLAN network (step 92). A first cellular signal quality instantaneous reading is made and the cellular/WLAN signal quality ratio is calculated (step 94). This step is referred to as STEP A. If the number of iteration steps for calculating the cellular/WLAN signal quality ratio is less than 2 (step 96), then the device waits a waiting time window, e.g., 2 seconds (step 98). In the event of WLAN disconnection during the waiting time window, the transition algorithm resumes from the WLAN disconnected state (step 90).

Then, a second iteration of cellular signal quality instantaneous reading is made and the cellular/WLAN signal quality ratio is calculated (step 94). This step is referred to as STEP B. If a transition (TR1 to TR6) is detected (step 100) then an indoor transition is declared (104). If a transition (TR7 to TR12) is detected (step 100) then an outdoor transition is declared (106). If no transition (TR1 to TR12) is detected (step 100) then 'no transition' is declared (step 124). To achieve higher accuracy, the number of iterations for calculating the cellular/WLAN signal quality ratio can be increased (e.g., 3, 4 or higher), for a more reliable confirmation of the cellular/WLAN signal trend during a transition to an indoor/outdoor environment.

Note that since the instantaneous cellular RSSI values continuously change randomly due to fading, shadowing, multipath and path loss effects; in one implementation, the mechanism utilizes averaged RSSI values which compensate for these negative effects. In addition, however, other factors may be used to indicate the indoor/outdoor transitions. For example, the AGC added offset to compensate for gain difference can be used as an indicator. When the cellular signal quality changes, the gain control is also modified accordingly, which can be used as an additional indication of the change in location. Further, Time In Advance that the Cell Controller sends to mobile device for transmission time adjustments based on mobile's distance from tower can also be used. Other possible factors include power control measurements which also change according to the quality of cellular link.

Figure 7:
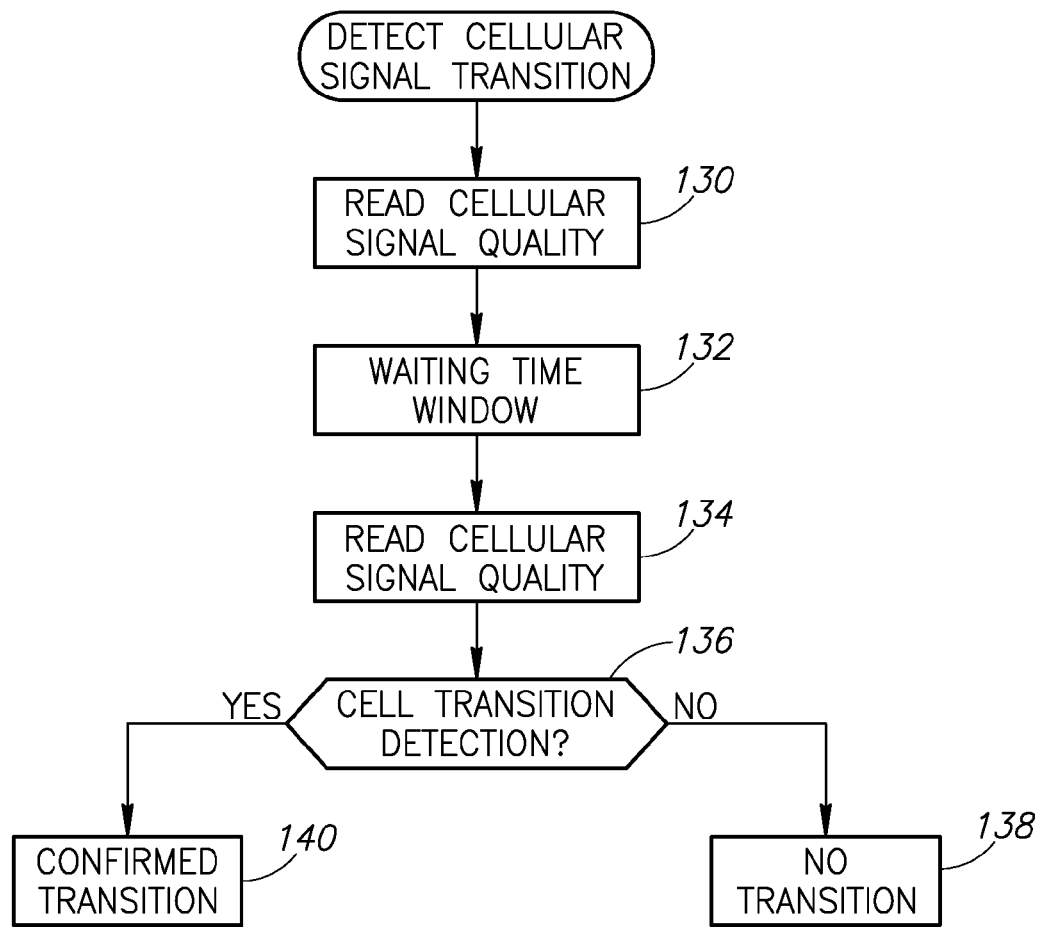
FIG. 7 is a flow diagram illustrating an example method of detecting cellular signal transitions.

A flow diagram illustrating an example method of detecting cellular signal transitions is shown in FIG. 7. This method is used in detecting a device's location when in a WLAN disconnected state. First, a first instantaneous cellular signal quality reading is made (step 130). After a waiting time window, e.g., 2 seconds (step 132), a second instantaneous cellular signal quality reading is made (step 134). A cell transition is then detected if the difference between the two cellular signal quality readings exceeds a threshold (e.g., +/−10 dBm)

(step 136). A confirmed transition is declared if the difference exceeds the threshold (step 140), otherwise no transition is declared (step 138).

Figure 8:
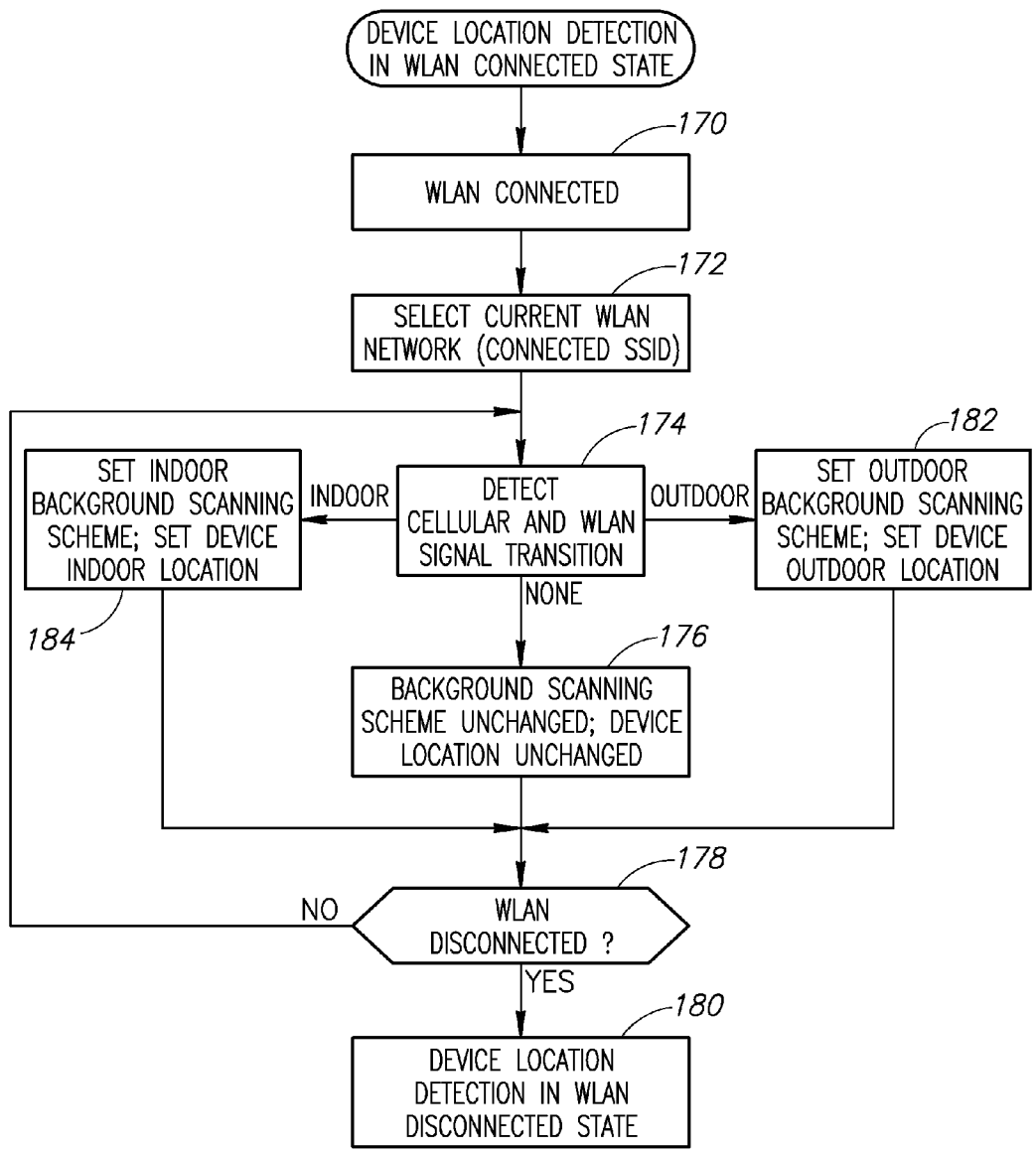
FIG. 8 is a flow diagram illustrating an example method of determining background scanning frequency and device location in a WLAN connected state.

A flow diagram illustrating an example method of determining device location in a WLAN connected state is shown in FIG. 8. This method is used to determine the location of the device when in a WLAN connected state (step 170). In this state, the background scanning is used in the WLAN connected state only for the user display of saved WLAN profiles. Next, the current WLAN network (i.e. the connected SSID) is selected (step 172). The method then attempts to detect a cellular and WLAN signal transition (step 174) as described in connection with the flow diagram of FIG. 6. If no transition is detected (step 174), the background scanning scheme is left unchanged and the device location is left unchanged as well (step 176).

If an indoor transition is detected, the device then sets the background scanning scheme to be used in the WLAN disconnected state to an "indoor" background scanning scheme and also sets the device location to "indoor" (step 184). An indoor scanning scheme comprises a more frequent scanning frequency than an outdoor scanning scheme, since the mobile device has been determined to be indoors.

If an outdoor transition is detected, the device then sets the background scanning scheme to be used in the WLAN disconnected state to an "outdoor" background scanning scheme and also sets the device location to "outdoor" (step 182). An outdoor scanning scheme comprises a less frequent scanning frequency than an indoor scanning scheme, since the mobile device has been determined to be outdoors. It is in this "outdoor" scanning scheme that results in significant power reduction for the mobile device since less frequent scanning is performed.

Whether an indoor, outdoor or no transition is detected, it is then checked whether the WLAN is disconnected (step 178). If it is not disconnected, the method returns to step 172 and repeats. If WLAN is disconnected, device location detection in the WLAN disconnected state is performed (step 180), as described in connection with the flow diagram in FIG. 9, described infra.

Figure 9:
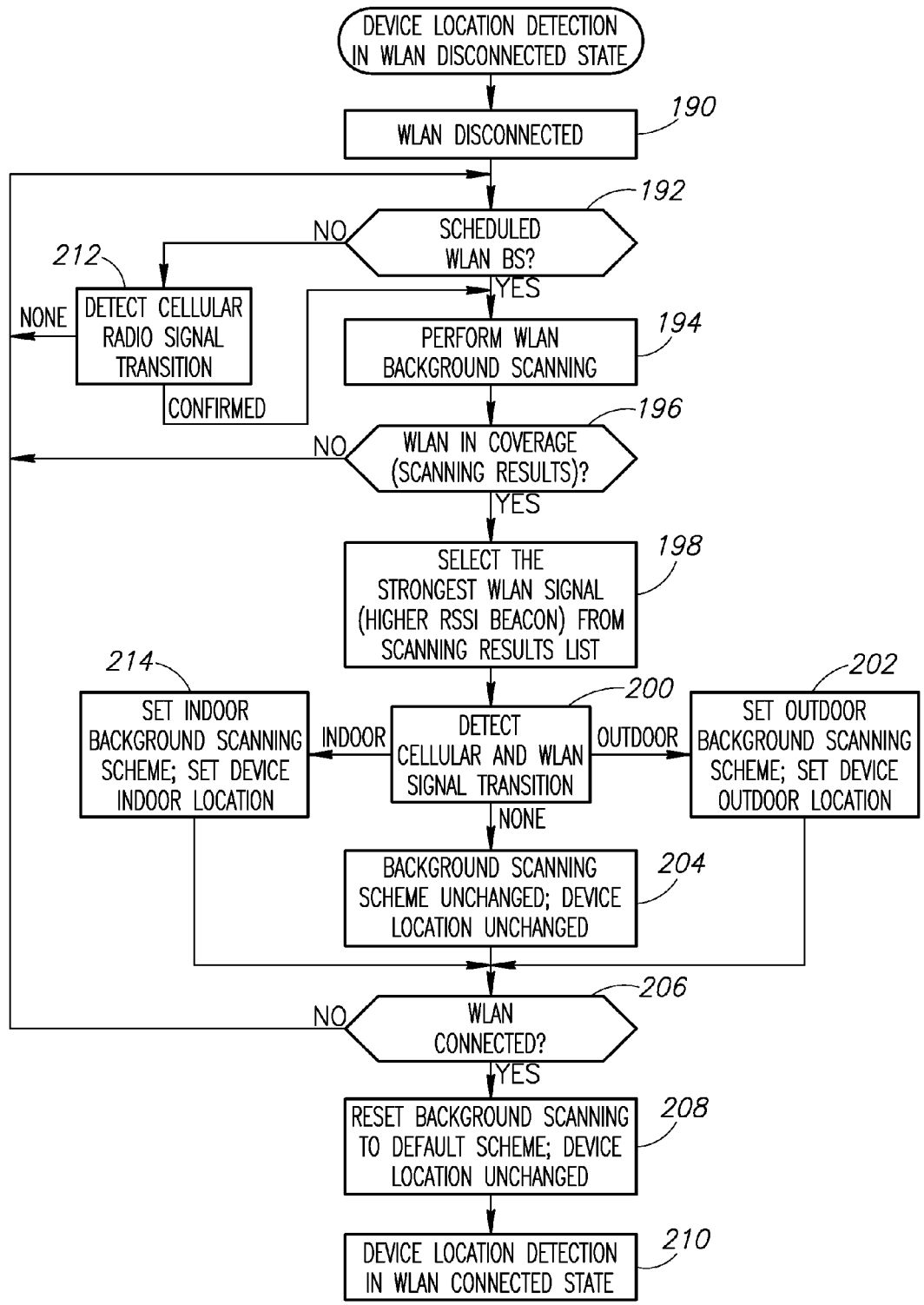
FIG. 9 is a flow diagram illustrating an example method of determining background scanning frequency and device location in a WLAN disconnected state.

A flow diagram illustrating an example method of determining device location in a WLAN disconnected state is shown in FIG. 9. It is assumed the device is in a WLAN disconnected state (step 190). The WLAN radio turning on will cause the device to set to the default background scanning scheme and indoor/outdoor location unknown. It is then determined whether a WLAN background scan is scheduled (according to the last selected background scanning scheme, i.e. high, low or normal (default) scan frequency) (step 192). If a scan is not scheduled, then the method continues with detect cellular radio signal transition (step 212) (described in connection with the flow diagram in FIG. 7), since the device may be moving out of a WLAN coverage area. If no cellular radio transition is detected, the method returns to step 192.

If a cellular radio transition is confirmed (step 212) or a WLAN background scan is scheduled (step 192), then WLAN background scanning is performed (step 194). It is then determined whether the device is in WLAN coverage and tries to detect surrounding WLAN access points (step 196). If no surrounding WLAN access points are found, the method returns to step 192. If surrounding WLAN access points are found, the strongest WLAN signal (i.e. higher RSSI Beacon) from the scanning results list is selected (step 198). The device then attempts to detect cellular and WLAN signal transition (step 200) as described in detail in connection with the flow diagram of FIG. 6.

If no transition is detected, the background scanning scheme and the device location are left unchanged (step 204). If an indoor transition is detected, the background scanning scheme is set to the indoor background scanning scheme and the device location is set to indoor location (step 214). Similarly, if an outdoor transition is detected, the background scanning scheme is set to the outdoor background scanning scheme and the device location is set to outdoor location (step 202).

It is then determined whether the WLAN is connected (step 206). If it is not connected, the method continues with step 192. If it is connected, the background scanning is reset to the default scheme and the device location is left unchanged (step 208). The device location in WLAN connected state method is then performed (step 210) as described in detail in connection with the flow diagram of FIG. 8. Note that background scanning in the WLAN connected state does not trigger execution of the device location method.

Figure 10:
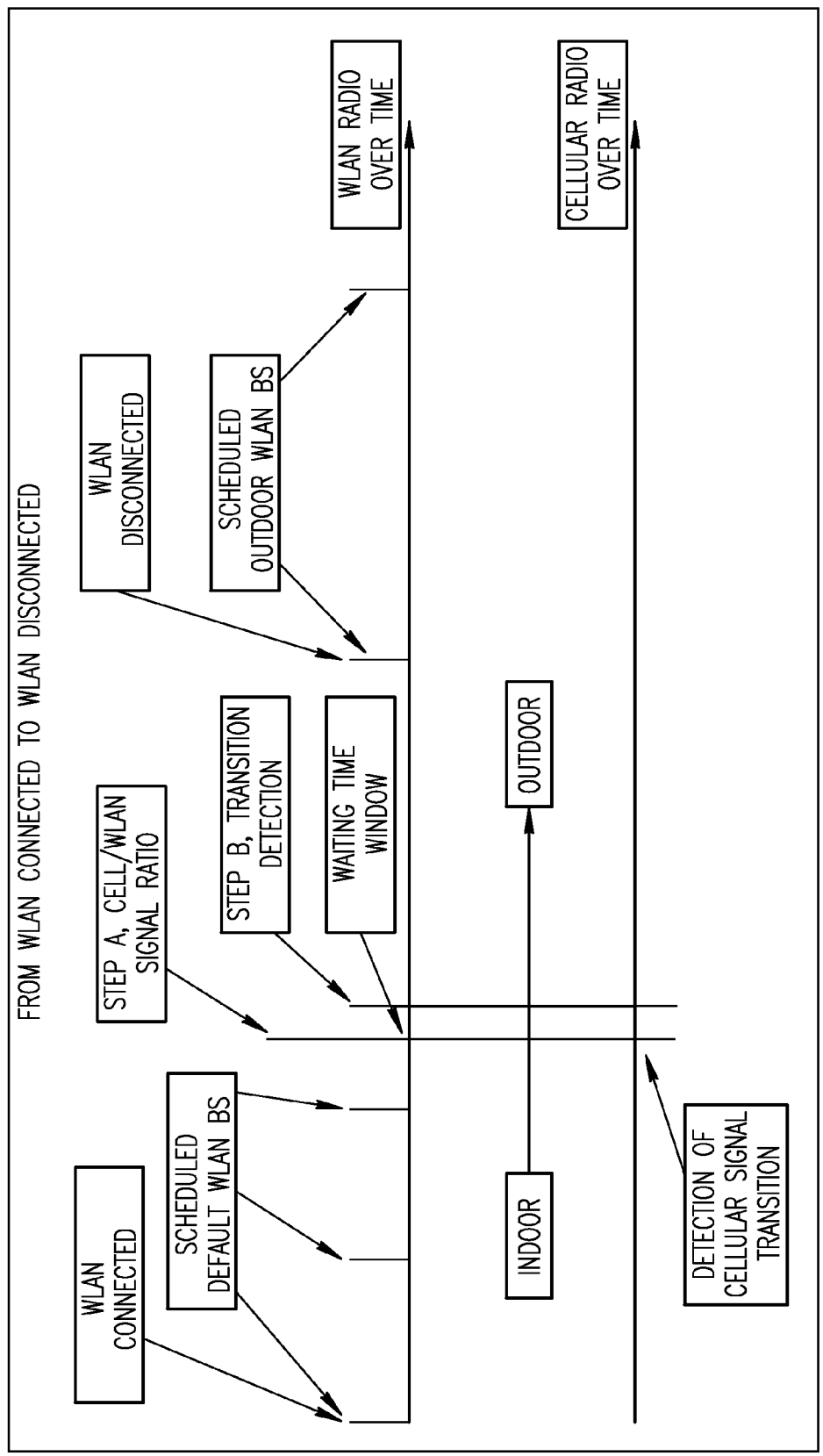
FIG. 10 is a timing diagram illustrating an indoor WLAN connected state to an outdoor WLAN disconnected state transition.

Several example timing diagrams are presented to aid in understanding the application of the methods described supra. They include various scenarios where the device is moving between indoors and outdoors and between connected and disconnected WLAN states. A timing diagram illustrating an indoor WLAN connected state to an outdoor WLAN disconnected state transition is shown in FIG. 10. The device is assumed starting in an indoor location with WLAN connected and scheduled default background scanning set. With reference to the method of FIG. 6, a STEP A event is detected where a change in the cellular/WLAN signal quality ratio is detected along with the possible detection of a cellular signal transition. A second confirming transition (STEP B) is detected as well after the waiting time window period. Eventually, as the device continues outdoors, WLAN becomes disconnected and outdoor WLAN background scanning is scheduled which results in a significant reduction in battery power consumption due to less frequent scanning.

Figure 11:
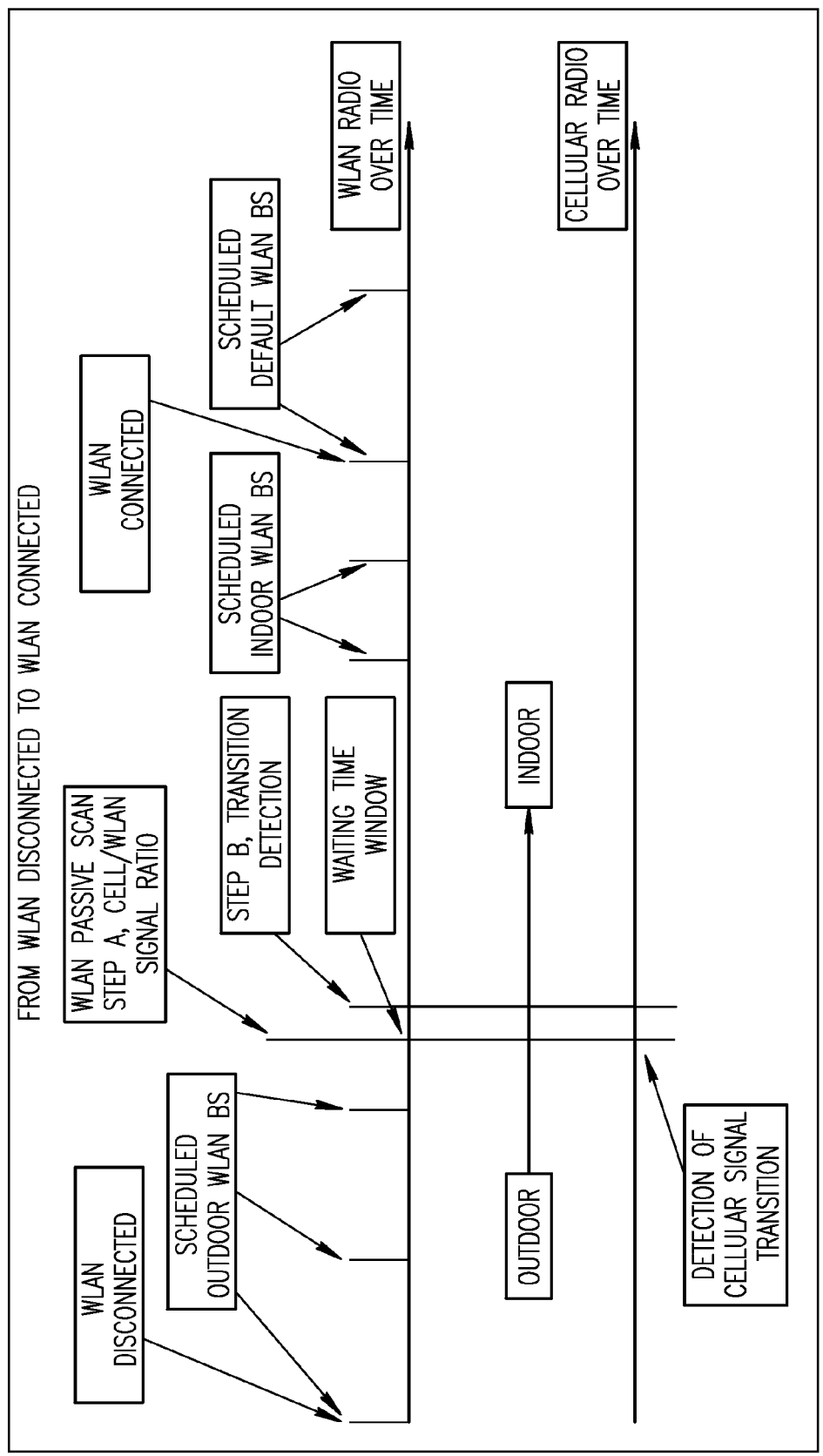
FIG. 11 is a timing diagram illustrating an outdoor WLAN disconnected state to an indoor WLAN connected state transition.

A timing diagram illustrating an outdoor WLAN disconnected state to an indoor WLAN connected transition is shown in FIG. 11. In this example, the device is outdoors with WLAN disconnected and scheduled with outdoor WLAN background scanning. A WLAN passive scan detects a transition (STEP A) as the device is moved indoors, along with the possible detection of a cellular signal transition. A second confirming transition (STEP B) is detected as well after the waiting time window period. In response, the device is set to indoor WLAN background scanning schedule (i.e. more frequent scanning) and eventually, WLAN is connected and the scheduling returns to default background scanning.

Figure 12:
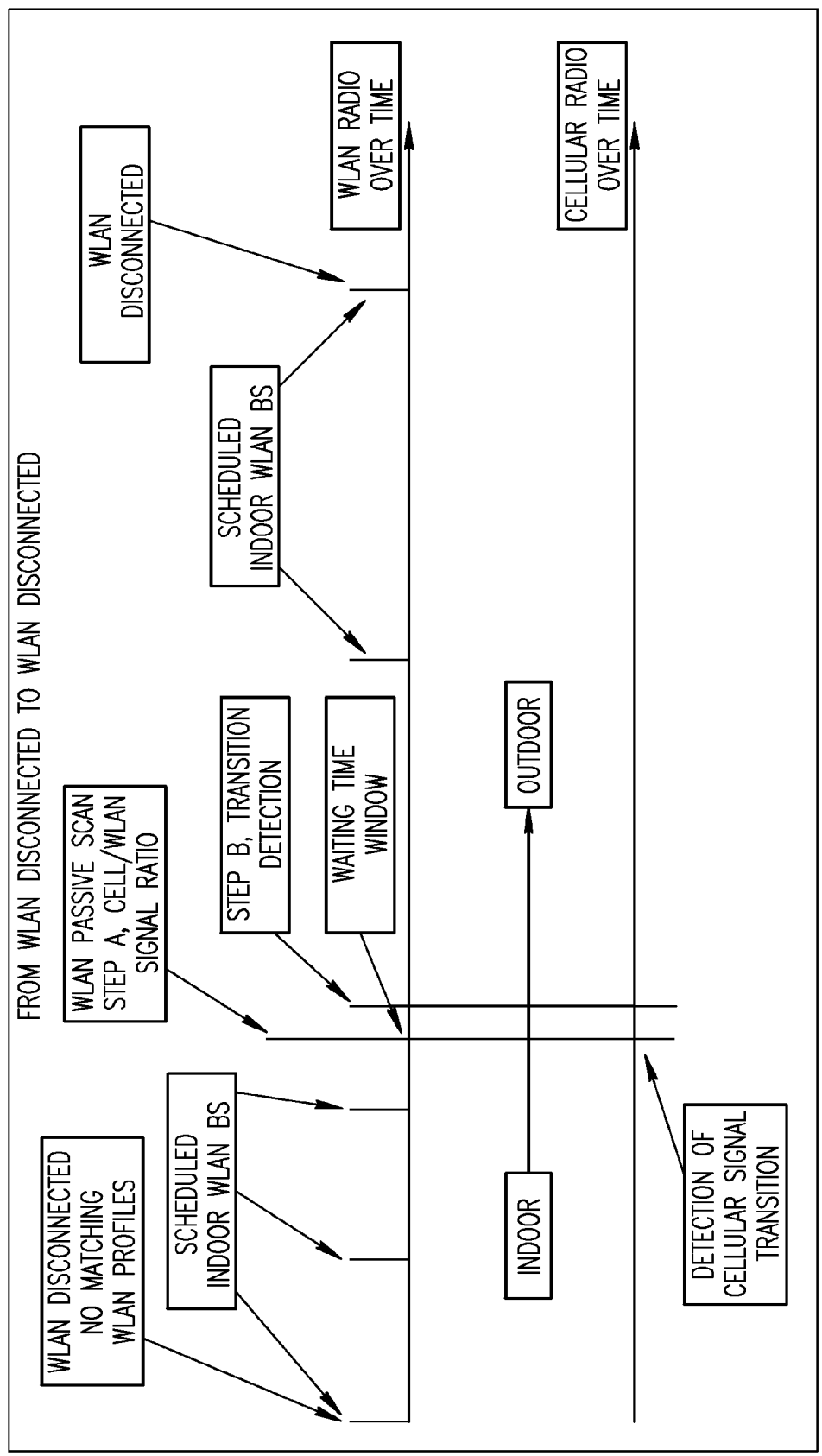
FIG. 12 is a timing diagram illustrating an indoor WLAN disconnected state to an outdoor WLAN disconnected state transition.

A timing diagram illustrating an indoor WLAN disconnected state to an outdoor WLAN disconnected state transition is shown in FIG. 12. The device is assumed starting in an indoor location with WLAN disconnected and scheduled indoor background scanning set. As the device is moved outdoors, a WLAN passive scan detects a transition (STEP A event) where a change in the cellular/WLAN signal quality ratio is detected along with the possible detection of a cellular signal transition. A second confirming transition (STEP B) is detected as well after the waiting time window period. Eventually, as the device continues outdoors, outdoor WLAN background scanning is scheduled which results in a significant reduction in battery power consumption due to less frequent scanning.

Figure 13:
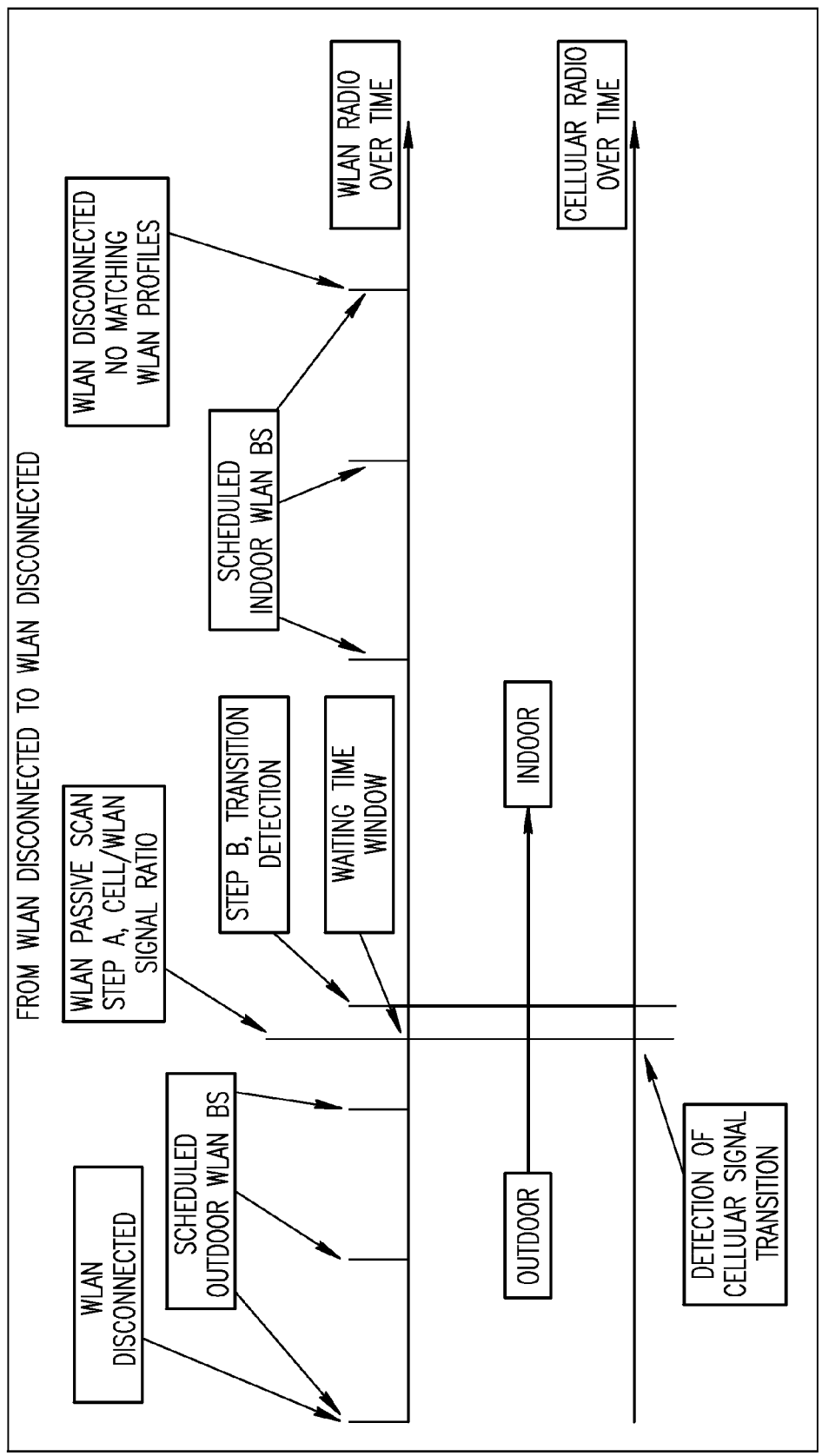
FIG. 13 is a timing diagram illustrating an outdoor WLAN disconnected state to an indoor WLAN disconnected state transition.

A timing diagram illustrating an outdoor WLAN disconnected state to an indoor WLAN disconnected transition is shown in FIG. 13. In this example, the device is outdoors with WLAN disconnected and scheduled with outdoor WLAN background scanning. A WLAN passive scan detects a transition (STEP A) as the device is moved indoors, along with the possible detection of a cellular signal transition. A second confirming transition (STEP B) is detected as well after the waiting time window period. In response, the device is set to indoor WLAN background scanning schedule (i.e. more frequent scanning) and eventually and WLAN is disconnected.

The terminology used herein is for the purpose of describing particular implementations only and is not intended to be limiting of the mechanism. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the mechanism has been presented for purposes of illustration and description, but is not intended to be exhaustive or limited to the mechanism in the form disclosed. As numerous modifications and changes will readily occur to those skilled in the art, it is intended that the mechanism not be limited to the limited number of implementations described herein. Accordingly, it will be appreciated that all suitable variations, modifications and equivalents may be resorted to, falling within the spirit and scope of the mechanism. The implementations were chosen and described in order to best explain the principles of the mechanism and the practical application, and to enable others of ordinary skill in the art to understand the mechanism for various implementations with various modifications as are suited to the particular use contemplated.

It is intended that the appended claims cover all such features and advantages of the mechanism that fall within the spirit and scope of the mechanism. As numerous modifications and changes will readily occur to those skilled in the art, it is intended that the mechanism not be limited to the limited number of implementations described herein. Accordingly, it will be appreciated that all suitable variations, modifications and equivalents may be resorted to, falling within the spirit and scope of the mechanism.

What is claimed is:

1. A method performed by a mobile device, the method comprising:
    at a first time:
        obtaining from a cellular radio subsystem incorporated in the mobile device a first cellular signal strength measurement and identifying to which first cellular signal strength category of a predefined set of cellular signal strength categories the first cellular signal strength measurement belongs; and
        obtaining from a wireless local area network (WLAN) radio subsystem incorporated in the mobile device a first WLAN signal strength measurement and identifying to which first WLAN signal strength category of a predefined set of WLAN signal strength categories the first WLAN signal strength measurement belongs;
        waiting a predefined amount of time following the first time;
    at a second time:
        obtaining from the cellular radio subsystem a second cellular signal strength measurement and identifying to which second cellular signal strength category of the predefined set of cellular signal strength categories the second cellular signal strength measurement belongs; and
        obtaining from the WLAN radio subsystem a second WLAN signal strength measurement and identifying to which second WLAN signal strength category of the predefined set of WLAN signal strength categories the second WLAN signal strength measurement belongs;
    comparing the first cellular signal strength category to the second cellular signal strength category;
    comparing the first WLAN signal strength category to the second WLAN signal strength category;
    in the event that both (i) the first cellular signal strength category represents a stronger cellular signal strength than the second cellular signal strength category and (ii) the first WLAN signal strength category represents a weaker WLAN signal strength than the second WLAN signal strength category, determining that the obtained measurements are indicative of an outdoor-to-indoor transition of the mobile device and increasing a background scanning frequency of the WLAN radio subsystem.

2. The method as recited in claim 1, wherein the predefined set of cellular signal strength categories comprises {Excellent, Very Good, Good, Average, Bad, Poor, Very Poor} and the predefined set of WLAN signal strength categories comprises {Excellent, Very Good, Good, Average, Bad, Poor, Very Poor}.

3. The method as recited in claim 2, wherein the following changes in signal strength measurement categories are indicative of an outdoor-to-indoor transition:
    cellular Excellent-to-Good and WLAN Very Poor-to-Bad;
    cellular Excellent-to-Bad and WLAN Very Poor-to-Good;
    cellular Excellent-to-Very Poor and WLAN Very Poor-to-Excellent;
    cellular Good-to-Bad and WLAN Bad-to-Good;
    cellular Good-to-Very Poor and WLAN Bad-to-Excellent; and
    cellular Bad-to-Very Poor and WLAN Good-to-Excellent.

4. A method performed by a mobile device, the method comprising:
    at a first time:
        obtaining from a cellular radio subsystem incorporated in the mobile device a first cellular signal strength measurement and identifying to which first cellular signal strength category of a predefined set of cellular signal strength categories the first cellular signal strength measurement belongs; and
        obtaining from a wireless local area network (WLAN) radio subsystem incorporated in the mobile device a first WLAN signal strength measurement and identifying to which first WLAN signal strength category of a predefined set of WLAN signal strength categories the first WLAN signal strength measurement belongs;
        waiting a predefined amount of time following the first time;
    at a second time:
        obtaining from the cellular radio subsystem a second cellular signal strength measurement and identifying to which second cellular signal strength category of the predefined set of cellular signal strength categories the second cellular signal strength measurement belongs; and
        obtaining from the WLAN radio subsystem a second WLAN signal strength measurement and identifying to which second WLAN signal strength category of the predefined set of WLAN signal strength categories the second WLAN signal strength measurement belongs;

comparing the first cellular signal strength category to the second cellular signal strength category;

comparing the first WLAN signal strength category to the second WLAN signal strength category;

in the event that both (i) the first cellular signal strength category represents a weaker cellular signal strength than the second cellular signal strength category and (ii) the first WLAN signal strength category represents a stronger WLAN signal strength than the second WLAN signal strength category, determining that the obtained measurements are indicative of an indoor-to-outdoor transition of the mobile device and decreasing a background scanning frequency of the WLAN radio subsystem.

5. The method as recited in claim 4, wherein the predefined set of cellular signal strength categories comprises {Excellent, Very Good, Good, Average, Bad, Poor, Very Poor} and the predefined set of WLAN signal strength categories comprises {Excellent, Very Good, Good, Average, Bad, Poor, Very Poor}.

6. The method as recited in claim 5, wherein the following changes in signal strength measurement categories are indicative of an indoor-to-outdoor transition:
cellular Very Poor-to-Bad and WLAN Excellent-to-Good;
cellular Very Poor-to-Good and WLAN Excellent-to-Bad;
cellular Very Poor-to-Excellent and WLAN Excellent-to-Very Poor;
cellular Bad-to-Good and WLAN Good-to-Bad;
cellular Bad-to-Excellent and WLAN Good-to-Very Poor; and
cellular Good-to-Excellent and WLAN Bad-to-Very Poor.

7. A mobile device, comprising:
a Wireless Local Area Network (WLAN) subsystem;
a cellular subsystem;
a memory;
a processor coupled to the WLAN radio subsystem, to the cellular radio subsystem, and to the memory, the processor operative:
at a first time:
to obtain from a cellular radio subsystem incorporated in the mobile device a first cellular signal strength measurement and to identify to which first cellular signal strength category of a predefined set of cellular signal strength categories the first cellular signal strength measurement belongs; and
to obtain from a wireless local area network (WLAN) radio subsystem incorporated in the mobile device a first WLAN signal strength measurement and to identify to which first WLAN signal strength category of a predefined set of WLAN signal strength categories the first WLAN signal strength measurement belongs;
to wait a predefined amount of time following the first time;
at a second time:
to obtain from the cellular radio subsystem a second cellular signal strength measurement and to identify to which second cellular signal strength category of the predefined set of cellular signal strength categories the second cellular signal strength measurement belongs; and
to obtain from the WLAN radio subsystem a second WLAN signal strength measurement and to identify to which second WLAN signal strength category of the predefined set of WLAN signal strength categories the second WLAN signal strength measurement belongs;

to compare the first cellular signal strength category to the second cellular signal strength category;

to compare the first WLAN signal strength category to the second WLAN signal strength category;

in the event that both (i) the first cellular signal strength category represents a stronger cellular signal strength than the second cellular signal strength category and (ii) the first WLAN signal strength category represents a weaker WLAN signal strength than the second WLAN signal strength category, to determine that the obtained measurements are indicative of an outdoor-to-indoor transition of the mobile device and to increase a background scanning frequency of the WLAN radio subsystem.

8. The mobile device as recited in claim 7, wherein the predefined set of cellular signal strength categories comprises {Excellent, Very Good, Good, Average, Bad, Poor, Very Poor} and the predefined set of WLAN signal strength categories comprises {Excellent, Very Good, Good, Average, Bad, Poor, Very Poor}.

9. The mobile device as recited in claim 8, wherein the following changes in signal strength measurement categories are indicative of an indoor-to-outdoor transition:
cellular Very Poor-to-Bad and WLAN Excellent-to-Good;
cellular Very Poor-to-Good and WLAN Excellent-to-Bad;
cellular Very Poor-to-Excellent and WLAN Excellent-to-Very Poor;
cellular Bad-to-Good and WLAN Good-to-Bad;
cellular Bad-to-Excellent and WLAN Good-to-Very Poor; and
cellular Good-to-Excellent and WLAN Bad-to-Very Poor.

10. A mobile device, comprising:
a Wireless Local Area Network (WLAN) subsystem;
a cellular subsystem;
a memory;
a processor coupled to the WLAN radio subsystem, to the cellular radio subsystem, and to the memory, the processor operative:
at a first time:
to obtain from a cellular radio subsystem incorporated in the mobile device a first cellular signal strength measurement and to identify to which first cellular signal strength category of a predefined set of cellular signal strength categories the first cellular signal strength measurement belongs; and
to obtain from a wireless local area network (WLAN) radio subsystem incorporated in the mobile device a first WLAN signal strength measurement and to identify to which first WLAN signal strength category of a predefined set of WLAN signal strength categories the first WLAN signal strength measurement belongs;
to wait a predefined amount of time following the first time;
at a second time:
to obtain from the cellular radio subsystem a second cellular signal strength measurement and to identify to which second cellular signal strength category of the predefined set of cellular signal strength categories the second cellular signal strength measurement belongs; and
to obtain from the WLAN radio subsystem a second WLAN signal strength measurement and to identify to which second WLAN signal strength category of the predefined set of WLAN signal strength categories the second WLAN signal strength measurement belongs;

to compare the first cellular signal strength category to the second cellular signal strength category;

to compare the first WLAN signal strength category to the second WLAN signal strength category;

in the event that both (i) the first cellular signal strength category represents a weaker cellular signal strength than the second cellular signal strength category and (ii) the first WLAN signal strength category represents a stronger WLAN signal strength than the second WLAN signal strength category, to determine that the obtained measurements are indicative of an indoor-to-outdoor transition of the mobile device and to decrease a background scanning frequency of the WLAN radio subsystem.

11. The mobile device as recited in claim 10, wherein the predefined set of cellular signal strength categories comprises {Excellent, Very Good, Good, Average, Bad, Poor, Very Poor} and the predefined set of WLAN signal strength categories comprises {Excellent, Very Good, Good, Average, Bad, Poor, Very Poor}.

12. The mobile device as recited in claim 11, wherein the following changes in signal strength measurement categories are indicative of an indoor-to-outdoor transition:
cellular Very Poor-to-Bad and WLAN Excellent-to-Good;
cellular Very Poor-to-Good and WLAN Excellent-to-Bad;
cellular Very Poor-to-Excellent and WLAN Excellent-to-Very Poor;
cellular Bad-to-Good and WLAN Good-to-Bad;
cellular Bad-to-Excellent and WLAN Good-to-Very Poor; and
cellular Good-to-Excellent and WLAN Bad-to-Very Poor.

* * * * *